United States Patent

Schoen

[15] 3,665,295

[45] May 23, 1972

[54] CONDUCTIVITY CELL FOR PARTICLE COUNTING APPARATUS

[72] Inventor: Kurt Schoen, Zurich, Switzerland

[73] Assignee: Contraves AG, Zurich, Switzerland

[22] Filed: May 18, 1970

[21] Appl. No.: 38,039

Related U.S. Application Data

[63] Continuation of Ser. No. 35,384, May 7, 1970.

[52] U.S. Cl. .................................324/30 B, 324/71 CP
[51] Int. Cl. ..........................G01n 27/42, G01n 27/00
[58] Field of Search ...............324/30 B, 30 R, 71 CP, 71 R

[56] References Cited

UNITED STATES PATENTS 3,444,464    5/1969    Coulter et al. ......................324/30 B
3,577,162    5/1971    Gaehwiler et al. ..................324/30 B Primary Examiner—Rudolph V. Rolinec
Assistant Examiner—Ernest F. Karlsen
Attorney—Werner W. Kleeman

[57] ABSTRACT

A conductivity cell for counting particles suspended in a liquid by detection of changes in the impedance of a fluid path caused by passage of particles through an aperture of the cell. The conductivity cell is provided with a pair of electrodes with an easily removable aperture disposed therebetween and a vent port adapted to permit purging of the cell after an analytic run.

8 Claims, 3 Drawing Figures

Patented May 23, 1972
3,665,295
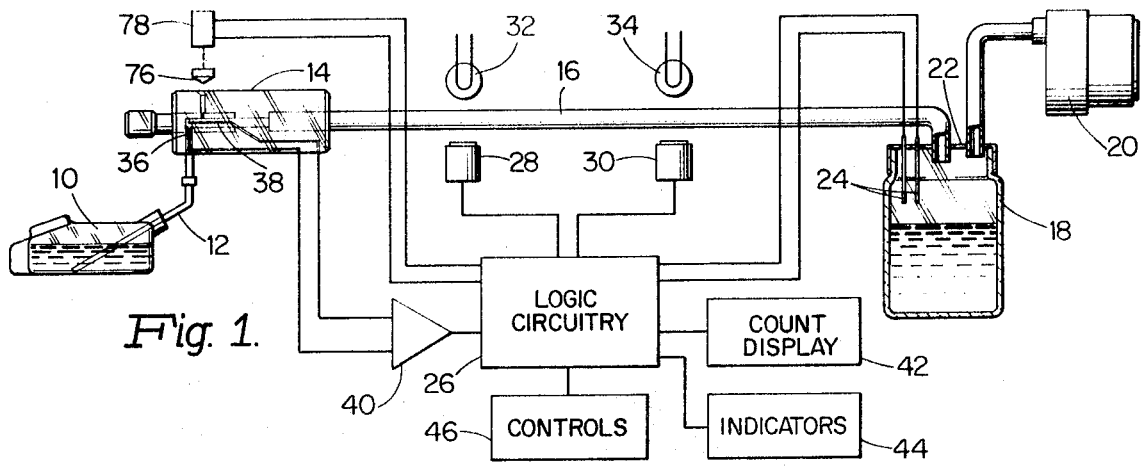
Fig. 1.
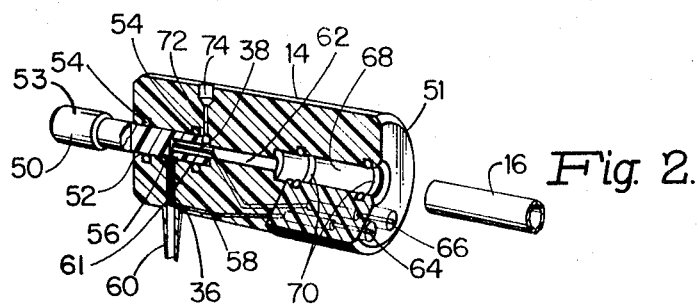
Fig. 2.
Fig. 3.
INVENTOR
KURT SONDEN
By: *Steiner H. Kleeman*
ATTORNEY

CONDUCTIVITY CELL FOR PARTICLE COUNTING APPARATUS

This application is a continuation of my commonly assigned, copending U.S. application, Ser. No. 35,384, filed May 7, 1970 and entitled "Particle Counting Apparatus."

FIELD OF THE INVENTION

The present invention relates to particle counters and more particularly to apparatus for the precise counting of particles suspended within a liquid medium.

BACKGROUND OF THE INVENTION

Systems are known for counting particles suspended in a liquid, a major application of such systems being the counting of red and white blood cells. In general, such particle counting systems include a pair of electrodes disposed within a fluid path and having an aperture disposed therebetween through which the particle-containing fluid flows. The impedance of the fluid path as sensed by the electrodes is materially altered by the presence of a particle within the aperture, giving rise to electrical pulses which can be electrically counted and which correspond to the number of particles passing through the aperture. Means are usually employed for metering a known volume of particle-containing liquid such that a particle count for a known volume of liquid can be provided.

Particle counting systems of known construction are usually quite complex and rather expensive. The high cost of conventional systems limits their availability to many who would otherwise have use for such systems. The aperture through which particles are caused to flow for counting are usually provided in conventional systems within a glass vessel and are not easily removable for cleaning or replacement. In general, the entire vessel must be removed or disassembled to gain access to the aperture. In addition, known systems often require many manipulative steps during operation in order to provide the requisite analysis, and are often difficult to calibrate and monitor during operation.

SUMMARY OF THE INVENTION

In brief, particle counting apparatus according to the invention includes a conductivity cell having a pair of electrodes therein and having an easily adjustable and interchangeable aperture disposed between the electrodes and sized to accommodate blood cells or other particles under analysis. The cell is embodied within a particle counting system which can include photosensitive metering techniques to determine the volume of liquid which is to be analyzed. The passage of particles through the aperture of the conductivity cell alters the impedance of the path through the aperture, and the change in impedance causes a corresponding change in voltage level which is sensed by appropriate detection circuitry.

The conductivity cell in a typical embodiment is of generally cylindrical configuration and has an aperture support member removably disposed within one end thereof. The support member includes an aperture disposed in a wall thereof and when the support member is within the cell, the aperture confronts first and second electrodes which are disposed within the cell on respective opposite sides of the aperture. The cell is easily installed within a system by input and output fluid couplings provided thereon, and electrical connection to the cell electrodes is usually accomplished by terminals provided on the cell.

DESCRIPTION OF THE DRAWINGS

The invention will be more fully understood from the following detailed description taken in conjunction with the accompanying drawings, in which:

FIG. 1 is a diagrammatic representation of a particle counting system embodying the invention;

FIG. 2 is a pictorial view, partly in section, illustrating a conductivity cell according to the invention; and FIG. 3 is a pictorial view, partly in phantom, of a particle counting system embodying the invention, in a typical packaging arrangement.

DETAILED DESCRIPTION OF THE INVENTION

For purposes of illustration, the novel conductivity cell is shown within a particle counting system which is especially adapted for counting blood cells. The system is illustrated in FIG. 1 and is itself the subject of U.S. application Ser. No. 807,853, filed Mar. 17, 1969.

The particles to be counted are suspended within a liquid contained within a sample flask 10, and fluid is drawn from flask 10 into the system by means of a tube 12. The particle-containing fluid is drawn from flask 10 by way of tube 12 to the input orifice of a novel conductivity cell 14 which includes a pair of electrodes with an aperture disposed therebetween and through which the fluid to be analyzed flows. The conductivity cell, which is the subject of the present invention, will be described in detail hereinafter.

Conductivity cell 14 is coupled to a flow tube 16 which terminates in a waste bottle 18. A suction pump 20 is also coupled to waste bottle 18 through a suitably sealed stopper 22 and is operative to draw sample fluid from flask 10 through conducitivity cell 14 and flow tube 16 for analysis. A pair of electrodes 24 are disposed within waste bottle 18 and are coupled to logic circuitry 26 for the detection of a predetermined upper level of waste fluid within bottle 18 to prevent overflow of waste fluid from the bottle and to also prevent the possible entry of waste fluid into suction pump 20 in the event of such overflow.

A first photosensor 28 is disposed adjacent flow tube 16 at a predetermined position along the length thereof and a second photosensor 30 is similarly disposed with respect to flow tube 16 in a position downstream from the first photosensor 28. Flow tube 16 is formed of a suitable light transmissive material such as glass and a pair of light sources 32 and 34 are arranged in operative association with respective photosensors 28 and 30. The photosensors are connected to logic circuitry 26 and are employed to provide electro-optical metering of the volume of liquid to be analyzed.

In the absence of fluid flowing within tube 16, photosensors 28 and 30 receive light from respective sources 32 and 34. During the passage of fluid within tube 16, however, the respective photosensors 28 and 30 do not receive light from their respective illumination sources. An electrical output signal is thus provided to logic circuitry 26 by photosensors 28 and 30 depending upon the presence of fluid at the sensor locations. The particle counting operation is commenced and terminated by gating signals provided by this electro-optical metering system. The passage of fluid within tube 16 past photosensor 28 causes a signal to be applied to logic circuitry 26 to commence a counting operation, while the counting operation is terminated upon receipt of a signal from photosensor 30. In this manner, a counting run is accomplished on a metered volume of liquid determined by the internal dimensions of flow tube 16 and the distance between the metering photosensors 28 and 30. The photosensitive metering technique itself is described in detail in copending U.S. application Ser. No. 809,322 of one of the inventors herein and now U.S. Pat. No. 3,577,162, granted May 4, 1971, entitled AUTOMATIC COUNTING SYSTEM FOR FLUID SUSPENDED PARTICLE and assigned to Contraves AG.

The electrodes 36 and 38 of conductivity cell 14 are connected to an input amplifier 40 which is a high input impedance, low noise, high gain operational amplifier. The output of amplifier 40 is coupled to logic circuitry 26 and the logic circuitry is operative to provide an output indication of particle count on a suitable display 42 and to energize suitable indicators 44. Operating controls 46 are coupled to logic circuitry 26 for enabling system operation.

The novel conductivity cell through which the sample fluid is caused to flow and in which the changes in impedance caused by the presence of particles within an aperture are detected is illustrated more particularly in FIG. 2. The cell 14 is of generally cylindrical configuration and typically is formed of a plastic material such as plexiglass or other polycarbonate plastic which is inert to the fluids being analyzed and which is electrically insulative. An aperture support 50, also typically formed of the same plastic material, is supported within a cylindrical opening coaxially provided at one end of the cell body 51 and is securely fitted therein such as by O-rings 54. An aperture through which the particle-containing fluid is caused to flow is formed within a ruby or other suitable element 56 disposed within the side of support 50, with the aperture in alignment with an input passage 58 which communicates with input nozzle 60. A visual marking 53 is provided on an end of aperture support 50 and is located to indicate aperture alignment when the marking is facing vertically upward.

The aperture within ruby 56 also communicates with an opening 61 formed in the inner end of support 50 and which in turn communicates with a coaxial passage 62 formed within cell body 51. The electrode 36 is disposed within passage 58 and has an end adjacent the aperture 56 and is connected to an electrical connector 64 formed within body 51. The second electrode 38 is disposed within the opening 61 formed in the end of support 50 and terminates in a second electrical connector 66 also formed within body 51. Connectors 64 and 66 are coupled by suitable interconnecting wires to input amplifier 40, as illustrated in FIG. 1. The flow tube 16 is coupled to cell 14 by means of a coaxial opening 68 formed in the end of body 51 opposite to support 50 and also containing O-rings 70 for sealing. A passage 72 is coupled to fluid passage 62 and includes an enlarged end portion or port 74 which is cooperative with a plunger 76 (FIG. 1) to provide venting of the cell. The plunger 76 is coupled to and operated by an electrically driven solenoid 78 which is energized by logic circuitry 26.

The construction of conductivity cell 14 permits the easy adjustment of the metering aperture within the fluid passage and also permits relatively easy cleaning and replacement of the aperture within the cell. The entire cell, which is easily installed and removed from the system, is electrically connected by means of connectors 64 and 66, and fluid coupled by simple installation of the cell onto an end of flow tube 16 and of input tube 12 to input passage 60.

The beginning of an analytic run is initiated by a starting signal, so that by means of logic circuitry 26 and the electrically driven solenoid 78 the plunger 76 tightly seals the air orifice or port 74. As a result, the particle-containing fluid is drawn by suction pump 20 from the flask 10 through the tube or conduit 12, the input passage or channel 60, the aperture 56 defining the measuring path and the fluid passage 62 into the flow tube 16. When the fluid has reached the level of the first read-out device defined by the photosensor 28 and light source 32, then the counting operation is initiated. After the fluid has reached the second read-out device defined by the other photosensor 30 and light source 34 counting is stopped, and the signal of the photocell 30 is utilized by logic circuitry 26 to open the air port 74 by means of the solenoid 78 and the plunger 76. Further withdrawal of particle-containing fluids through the measuring path is prevented by the air which has been sucked into the measuring cell and the flow tube is cleaned by the fluid. Hence, the system is automatically purged after completion of a counting operation and is thus immediately in a state of readiness or condition for a further analytical run.

The automatic purging of fluid from the cell and the system after an analytical run offers major advantages over particle counting systems of conventional design. As discussed, automatic opening of the vent of the conductivity cell after a counting run causes air to be drawn into the cell with consequent purging of fluid within passages 61 and 62 of cell 14 and within flow tube 16. As a result of this purging operation, no fluid remains within the otherwise conductive path formed between electrodes 36 and 38 and the aperture disposed therebetween, and thus no conduction between electrodes occurs. An excitation voltage applied to the cell electrodes need not therefore be removed, as in conventional systems, since no fluid is present to permit conduction. Excitation is thus continuously applied to the electrodes when the system is energized, but conduction within the conductivity cell occurs only during an analytic run.

The absence of conduction after the system is vented also prevents electrolysis and consequent production of gas bubbles during the time occurring between runs. Such absence of conduction also permits the use of smaller electrodes since the conductivity of the electrodes is not materially diminished by formation of gas bubbles on the surface thereof such as occurs to a greater extent in conventional systems. It should be noted that although residual fluid may remain by capillary action within input passage 58, this residual fluid is not analyzed during a subsequent run since the actual fluid to be analyzed will flow through the cell aperture before a start signal is provided by photosensor 28.

Since fluid is only withdrawn until completion of the counting operation, there is avoided unnecessary removal of fluid from the flask 10. Consequently, consumption of particle-containing fluid is held to a minimum. Monitoring of the apparatus during an analytical run or measuring operation is unnecessary because of the automatic stoppage and interruption of the suction process.

The novel system is packaged within a compact housing which is of a size and configuration adapted for desk top operation. The general packaging arrangement is illustrated in FIG. 3. The conductivity cell 14 and its associated flow tube 16 are arranged in the illustrated embodiment on the right hand side of the cabinet 86 with metering photosensors 28 and 30 and associated light sources 32 and 34 being contained within respective housings 31 and 33 disposed around flow tube 16. Tube 16 is coupled via tubing 80 to waste bottle 18 which is also coupled via tubing 82 to suction pump 20 and associated flow regulator 84 for providing a uniform flow rate. The sample flask 10 is inserted within the system in the manner illustrated with input tube 12 disposed within flask 10 for withdrawal of fluid therefrom into cell 14.

The instrument cabinet 86 includes a section on the right-hand side thereof which includes an opening for simple insertion of a sample flask 10, and an upper opening for easy access to aperture support 50 of conductivity cell 14 for the adjustment or replacement of the metering aperture. A nozzle 95 is coupled from pump 20 to the front panel of housing 86 to provide a source of positive air pressure for blowing out support 50 and the aperture therein. Support 50 is placed coaxially onto nozzle 95 to clean the aperture. The controls and indicators are contained on instrument housing 86 and include a count control 90, initiating the starting of an analytic run, calibrate control 92, verify indicator 94, on-off control 96 and waste indicator 98. In the illustrated embodiment, the controls are of the self-illuminating pushbutton type.

The particle count is displayed on a three digit electromechanical counter which includes digital output indicators 100; a white blood cell indicator 102 and a red blood cell indicator 104 are provided to denote which cell count is being displayed. Fiberoptic or other light transmitting cables 106 and 108 are respectively coupled from the lamps associated with indicators 102 and 104 to positions between the digits of indicator 100 to provide selective decimal point indication depending upon whether a red blood cell count or a white blood cell count is being performed. If desired, a switch 112 may be selectively activated by the sample flask 10 used for red and white blood cell analysis to cause corresponding activation of decimal point indicators 116 or 114 to appropriately display the correct count magnitude.

The invention is not to be limited by what has been particularly shown and described except as indicated in the appended claims.

What is claimed is:

1. For use in a system for counting particles suspended within a liquid, a conductivity cell comprising:

a cell body having an input passage formed therein and adapted to be coupled to a supply of liquid to be analyzed, and an output passage formed therein and adapted to be coupled to a flow tube through which liquid flows for analysis;

a support member having an apertured means with an aperture positioned in a surface thereof, said apertured means having opposed end faces defining a first end face and a second end face, said support member being removably disposed within said cell body with said aperture in alignment with said input passage, said support member having a passage formed in an end thereof and communicating between said aperture and the output passage of said cell body;

a first electrode disposed within said input passage and confronting said first end face of said apertured means;

a second electrode disposed within said output passage and confronting said second end face of said apertured means;

said first and second electrodes being completely fixedly supported by and retained at said cell body, thereby enabling detachment of said support member and apertured means from said cell body without necessitating detachment of said first and second electrodes from said cell body; and means within said cell body for providing electrical connection from said first and second electrodes to respective terminals disposed on said cell body.

2. The invention according to claim 1 wherein said support member is of elongated configuration and when disposed within said cell body has a portion which extends outwardly therefrom.

3. The invention according to claim 2 wherein said elongated support member includes a marking for visual indication of alignment of said aperture with said input passage.

4. The invention according to claim 1 including a vent passage within said cell body and communicating with said output passage at a position near said aperture.

5. The invention according to claim 1 wherein said cell body is of generally cylindrical configuration and said support member is also of generally cylindrical configuration and is disposed coaxially within said cell body.

6. The invention according to claim 1 wherein sealing means are provided between said cell body and said support member and sealing means provided within said output passage for sealingly engaging a flow tube disposed therein.

7. For use in a system for counting particles suspended within a liquid, a conductivity cell comprising:

a cell body having an input passage formed therein and adapted to be coupled to a supply of liquid to be analyzed, and an output passage formed therein and adapted to be coupled to a flow tube through which liquid flows for analysis;

a support member having an apertured means with an aperture positioned in a surface thereof, said apertured means having opposed end faces defining a first end face and a second end face, said support member being removably disposed within said cell body with said aperture in alignment with said input passage, said support member having a passage formed in an end thereof and communicating between said aperture and the output passage of said cell body;

said cell body being of generally cylindrical configuration and said support member is also of generally cylindrical configuration and is disposed coaxially within said cell body;

said cylindrical support member including a passage coaxially disposed within an end thereof and having an inner end communicating with said second end face of said apertured means and an outer end communicating, when said support member is disposed within said cell body, with said output passage;

a first electrode disposed within said input passage and confronting said first end face of said apertured means;

a second electrode disposed within said output passage and confronting said second end face of said apertured means; and means within said cell body for providing electrical connection from said first and second electrodes to respective terminals disposed on said cell body.

8. For use in a system for counting particles suspended within a liquid, a conductivity cell comprising:

a cell body having an input passage formed therein and adapted to be coupled to a supply of liquid to be analyzed, and an output passage formed therein and adapted to be coupled to a flow tube through which liquid flows for analysis;

a support member having an apertured means with an aperture positioned in a surface thereof, said apertured means having opposed end faces defining a first end face and a second end face, said support member being removably disposed within said cell body with said aperture in alignment with said input passage, said support member having a passage formed in an end thereof and communicating between said aperture and the output passage of said cell body;

said support member being of generally cylindrical configuration and disposed coaxially within said cell body;

said cylindrical support member including a passage coaxially disposed within an end thereof and having an inner end communicating with said second end face of said apertured means and an outer end communicating, when said support member is disposed within said cell body, with said output passage;

a first electrode disposed within said input passage and confronting said first end face of said apertured means;

a second electrode disposed within said output passage and confronting said second end face of said apertured means; and means within said cell body for providing electrical connection from said first and second electrodes to respective terminals disposed on said cell body.

* * * * *